United States Patent [19]

Ito et al.

[11] 3,913,139

[45] Oct. 14, 1975

[54] MULTIELEMENT MAGNETIC HEAD COMPRISING A COMMON MAGNETIC MEMBER UNITING POLE TIPS AND AN OPPOSING MAGNETIC MEMBER

[75] Inventors: Masaru Ito; Sadayuki Mitsuhashi, both of Tokyo, Japan

[73] Assignee: Nippon Electric Company, Limited, Tokyo, Japan

[22] Filed: June 26, 1973

[21] Appl. No.: 373,841

[30] Foreign Application Priority Data

Sept. 22, 1972 Japan .................................. 47-95881

[52] U.S. Cl. .................................. 360/103; 360/121

[51] Int. Cl.$^2$ .................................. G11B 5/60

[58] Field of Search ............ 360/102, 103, 121, 125

[56] References Cited

UNITED STATES PATENTS

| | | | |
|---|---|---|---|
| 3,353,261 | 11/1967 | Bradford | 360/125 |
| 3,731,005 | 5/1973 | Shearman | 360/125 |
| 3,792,492 | 2/1974 | Neace | 360/103 |

*Primary Examiner*—Vincent P. Canney
*Attorney, Agent, or Firm*—Sughrue, Rothwell, Mion, Zinn & Macpeak

[57] ABSTRACT

A multielement magnetic head comprises a plurality of magnetic pole tips and a common opposing magnetic member. The pole tips have first ends remote from second ends forming aligned magnetic gaps in cooperation with the opposing end of the opposing magnetic member. The first ends of the pole tips and the corresponding end of the opposing magnetic member are united together by means of a common magnetic member.

1 Claim, 5 Drawing Figures

U.S. Patent Oct. 14, 1975 3,913,139

MULTIELEMENT MAGNETIC HEAD COMPRISING A COMMON MAGNETIC MEMBER UNITING POLE TIPS AND AN OPPOSING MAGNETIC MEMBER

BACKGROUND OF THE INVENTION

This invention relates to a multielement magnetic head or a magnetic head comprising a plurality of magnetic transducer elements having aligned magnetic gaps, respectively, and a method of making the same.

A multielement magnetic head is in use together with a magnetic disk, a magnetic drum, a magnetic tape, or a similar magnetic memory device provided with a plurality of information recording and reproducing tracks associated with the respective magnetic transducing elements as a memory arrangement generally called a fixed-head file. For such a multielement magnetic head, it is necessary to make the spacing between the magnetic transducing elements uniform. In addition, it is necessary to furnish the elements with coils, respectively. In particular connection with the coil arrangement, a conventional multielement head, such as disclosed in Japanese Patent Publication No. Syo 47-16757 of a patent application filed in the name of International Business Machines Corporation claiming Convention priority based on a United States Patent Application Ser. No. 737,759, is defective in its productivity.

A multielement magnetic head described by E. E. Haertlein in "IBM Technical Disclosure Bulletin," Vol. 13, No. 8 (January 1971), pages 2333 and 2334, comprises a plurality of separated magnetic pole tips and a so-called back bar comprising a plurality of fingers extending from a base and clamped against the free ends of the pole tips, after a prewound coil is placed over each finger. This facilitates manufacture of the separate coils. The Haertlein arrangement, however, is still troublesome to manufacture on account of the necessities of forming the fingers and of achieving reliable contact between the fingers and the separate pole tips. In addition, the Haertlein arrangement has not sastisfactory transducing efficiency because the coils are located relatively remote from the read-write gaps.

SUMMARY OF THE INVENTION

It is therefore an object of the present invention to provide a multielement magnetic head of simple structure and a method of making the same.

It is another object of this invention to provide a multielement magnetic head which has simple structure for coil arrangement and yet has raised transducing efficiency and a method of making such a multielement magnetic head.

According to this invention, there is provided a magnetic head comprising a plurality of first magnetic members having first ends and aligned second ends, a coil provided around each of said first magnetic members between the first and the second ends thereof, a second magnetic member having a first end spaced apart from said first ends of said first magnetic members and a second end defining a plurality of aligned magnetic gaps in cooperation with said second ends of said first magnetic members, and a third magnetic member uniting said first ends of said first magnetic members and said first end of said second magnetic member.

According to this invention, there is also provided a method of making a magnetic head comprising the steps of forming a first and a second magnetic member, each having a first end and a second end, bonding the second ends of said magnetic members together with a nonmagnetic bonding medium, forming a plurality of cuts in said first magnetic member to divide the same into a plurality of first magnetic members, providing a coil on each of said first magnetic members between the first and the second ends thereof, and uniting said first ends of said first magnetic members and said first end of said second magnetic member by means of a third magnetic member.

In connection with the structure and the method according to this invention, the coils may be provided either by winding the coil wires around the respective first magnetic members or by placing prewound coils on the respective first magnetic members.

DESCRIPTION OF THE PREFERRED EMBODIMENTS

Figure 1:
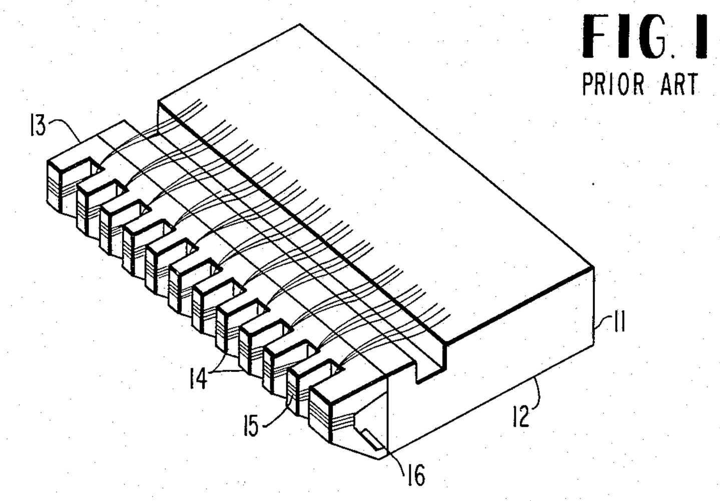
FIG. 1 is a schematic perspective view of a conventional multielement magnetic head.

Referring to FIG. 1, a multielement magnetic head disclosed in the above-cited Japanese Patent Publication will be illustrated in order to facilitate understanding of the present invention. The multielement head comprises a ferrite common block 11 having a bottom surface 12 which serves as a slider adapter to slide on the air-bearing provided by a thin layer of the air flowing together with the magnetic recording medium (not shown) being fed. The head further comprises a ferrite pole tip member 13 having a plurality of fingers 14 extending from a common base and having a like number of coils 15 wound thereon. The tips of the fingers 14 are spaced apart from the opposing surface portion of the common block 11 to provide aligned magnetic gaps 16, which are filled with a mass of a nonmagnetic bonding medium.

In manufacture, the fingers 14 are made by forming cuts into the ferrite pole tip member 13 preliminarily bonded to the common block 11. This makes it possible to manufacture the fingers 14 relatively easily and to provide the multielement head with sufficiently uniform transducing capability. To wind the coils 15 around the respective fingers 14 by automatic apparatus, however, is very difficult if not impossible because closed magnetic circuits are already formed.

Figure 2:
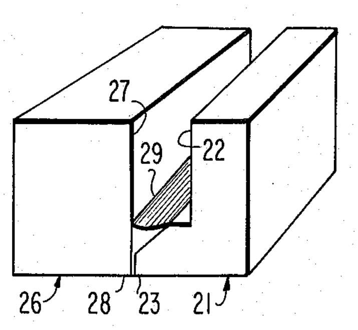
FIG. 2 is a schematic perspective view of an essembly of a first and a second magnetic member during manufacture of a multielement magnetic head according to the instant invention.

Referring to FIG. 2, a magnetic head according to this invention may be manufactured by providing at first a first magnetic member 21 having a first end 22 and a second end 23 and a second magnetic member 26 having a first end 27 and a second end 28. The material of the magnetic members 21 and 26 may be ferrite, a nickel-iron alloy known by a trademark "Permalloy,"

or the like alloy of a high magnetic permeability. The second ends 23 and 28 of the magnetic members 21 and 26 are bonded together with a mass 29 of a nonmagnetic bonding medium, which may be glass or an organic bonding agent. As for the first embodiment of this invention to be described, the first ends 22 and 27 of the magnetic members 21 and 26 are equally spaced apart.

Figures 3, 4, 5:
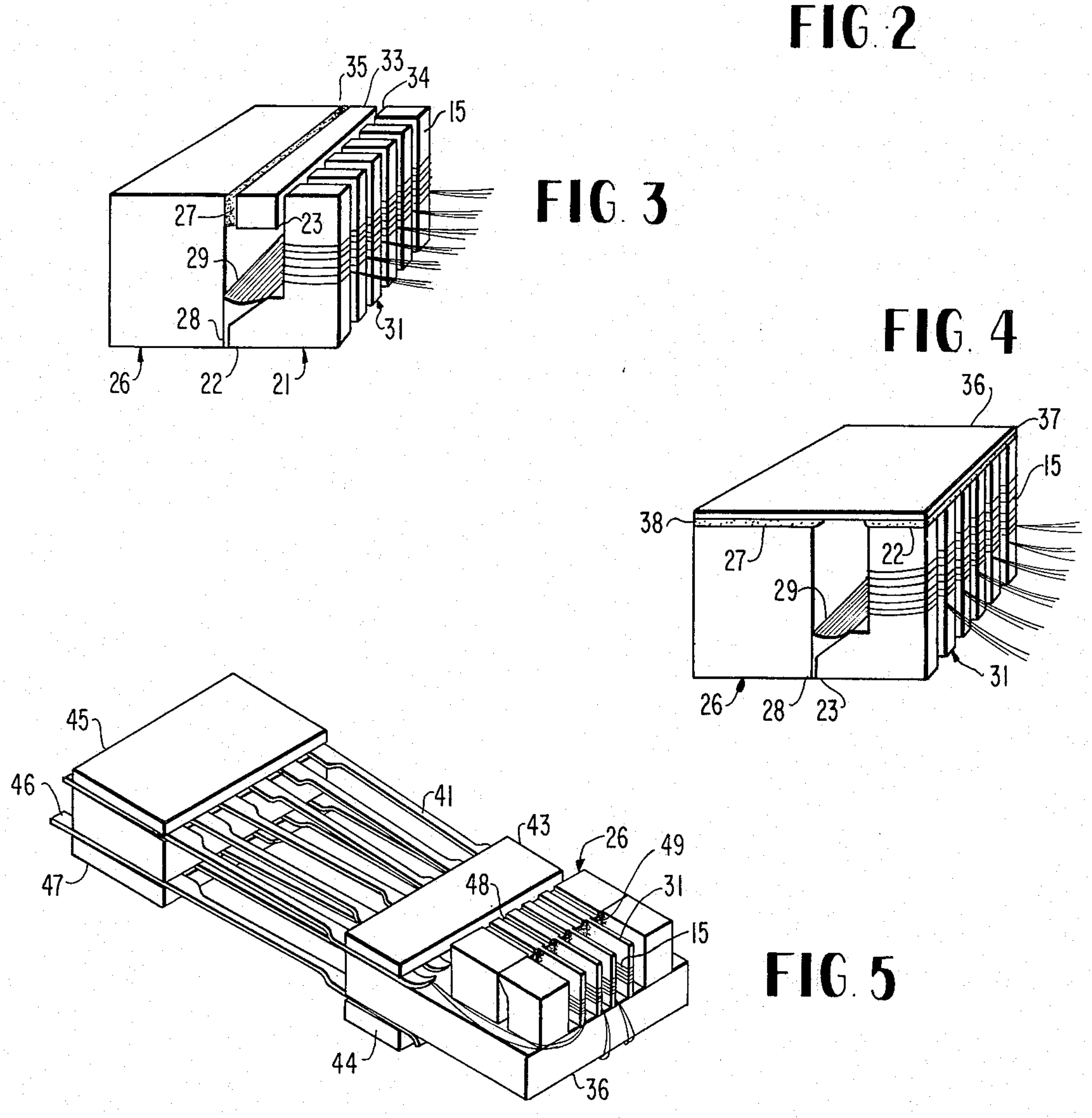
FIG. 3 is a schematic perspective view of a first embodiment of this invention.
FIG. 4 is a similar view of a second embodiment of this invention.
FIG. 5 is a similar view of a third embodiment of this invention.

Referring to FIG. 3, a plurality of cuts are now formed in the first magnetic member 21 by cutting apparatus, such as a diamond cutter, to reach the mass 29 of the bonding medium, extending throughout the first and the second ends 22 and 23 thereof, whereby the first magnetic member 21 is divided into a plurality of first magnetic members 31 having the first ends 22 and the second ends 23. A plurality of coils 15 are wound around the respective first magnetic members 31 between the first and the second ends 22 and 23 thereof. A third magnetic member 33 of a rectangular parallelopiped shape is placed between the first ends 22 of the first magnetic members 31 and the opposing first end 27 of the second magnetic member 26 and bonded to such ends 22 and 27 with masses 34 and 35 of a magnetic or a nonmagnetic bonding medium to unite the first ends 22 and 27 of the first and the second magnetic members 31 and 26 together. The material of the third magnetic member 33 may be the same as that of the first and the second magnetic members 31 and 26. A prewound coil may be placed on each of the first magnetic members 31 to form in effect the coils 15. It will readily be seen that a plurality of aligned magnetic gaps are formed between the second ends 23 of the first magnetic members 31 and the opposing second end 28 of the second magnetic member 26.

The use of the third magnetic member 33 simplifies manufacture of the coils 15 and improves the uniformity of the transducing capability of the transducing elements. Even compared with the Haertlein device mentioned in the preamble of the instant specification, the first embodiment is easy to manufacture because formation of the back bar comprising a plurality of fingers and fixing thereof to the separated pole tip members are unnecessary with this invention. In addition, the coils 15 placed nearer to the read-write gaps in accordance with this invention raise the transducing efficiency. Furthermore, the third magnetic member 33 according to the first embodiment serves to provide shorter closed magnetic paths, thereby reducing the magnetic reluctance of the magnetic circuits and improving the high-frequency characteristics.

Referring to FIG. 4, a second embodiment of this invention comprises a plurality of first magnetic members 31 having first ends 22 and aligend second ends 23, a coil 15 wound around each of the first magnetic members 31 between the first and second ends 22 and 23 thereof, and a second magnetic member 26 having a first end 27 spaced apart from the first ends 22 of the first magnetic members 31 and a second end 28 defining a plurality of aligned magnetic gaps in cooperation with the second ends 23 of the first magnetic members 31. The magnetic gaps are filled with a mass 29 of a nonmagnetic medium. The first ends 22 and 27 of the magnetic members 31 and 26 are aligned on a common plane intersecting a plane passing through the magnetic gaps. The second embodiment further comprises a third magnetic member 36 of a planar shape uniting the first ends 22 of the first magnetic members 31 and the first end 27 of the second magnetic member 26. The third magnetic member 36 may be bonded to the first ends 22 and 27 with masses 37 and 38 of a magnetic bonding medium. Alternatively, the first ends 22 and 27 are lapped and the third magnetic member 36 may be attached to such ends 22 and 27 with its surface portions to be brought into contact with such ends 22 and 27 preliminarily lapped. In the manner mentioned above, a prewound coil may be placed on each of the first magnetic members 31 to wind in effect the coils 15 on the respective magnetic members 31.

Instead of the third magnetic member 36 used in the second embodiment, use may be made of a third magnetic member (not shown) having a protrusion and surface portions on both sides of the protrusion which are aligned on a common plane. The third magnetic member of this type is used to unite the first and the second magnetic members 31 and 26 with the protrusion put in between the opposing end surfaces adjacent to the first ends 22 and 27 of the first and the second magnetic members 31 and 26 and with the aligned surface portions either lapped and brought into direct contact with such ends 22 and 27 or merely brought into proximity thereof and bonded thereto with masses of a magnetic bonding medium. Inasmuch as the protrusion serves the role of the third magnetic member 33 illustrated with reference to FIG. 3, this arrangement provides better magnetic characteristics than the second embodiment.

Referring to FIG. 5, a third embodiment of this invention is similar in principle to the second embodiment and comprises similar parts designated with like reference numerals. It will, however, be seen that the third magnetic member 36 is wider than the corresponding member of the second embodiment and that the head assembly is held by a plurality of parallel leaf spring pairs 41 which are interposed at their ends adjacent to the head assembly between a ceramic plate 43, the third magnetic member 36, and another ceramic plate 44 and at their ends remote from the head assembly between three ceramic plates 45, 46, and 47. The wide-area third magnetic member 36 serves as a spacer for the parallel leaf springs 41 in cooperation with the ceramic plate 46 interposed between the parallel leaf springs 41 at the remote ends. The parallel leaf springs 41 serve to urge the head assembly towards the magnetic recording medium (placed above the head assembly but not shown) and as the electrical leads for the coils 15. In order to dispense with any additional coatings of an insulating material, the third magnetic member 36 is preferably made of a material, such as nickel-zinc ferrite, having a high-magnetic permeability and a low electric conductivity. The second magnetic member 26 is provided with channel-shaped parallel grooves 48 in alignment with the cuts separating the first magnetic members 31. These grooves 48 serve to prevent the head assembly from being urged too far apart from the magnetic recording medium by the cushioning function of the air-bearing. In addition, small masses 49 of a nonmagnetic bonding medium are applied to the second end portions of the first magnetic members 31 to insure the relative positioning of the second ends of the first and the second magnetic members 31 and 26. These masses 49 are preferably applied by forming indents in the single first magnetic member and filling the indents with the masses 49 before the single first magnetic member is bonded to the second magnetic member 26 and then divided into separate first magnetic members 31.

While a particular series of steps of making a multielement head of the structure according to this invention was described with reference to FIGS. 2 and 3, it is to be noted that the structure may be attained with other methods provided that the coils 15 are in effect wound on the first magnetic members 31 while their first ands 22 are free.

What is claimed is:

1. A magnetic head comprising a plurality of first magnetic members having first ends and aligned second ends, a coil provided around each of said first magnetic members between the first and second ends thereof, a second magnetic member having a first end spaced apart from said first ends of said first magnetic members and a second end defining a plurality of aligned magnetic gaps in cooperation with said second ends of said first magnetic members, said first ends of said first magnetic members and said first ends of said second magnetic member being aligned in a common plane intersecting a plane passing through said magnetic gaps, and a third magnetic member uniting said first ends of said first magnetic members and said first end of said second magnetic member, said third magnetic member having surface portions aligned on a common plane and brought into contact with said first ends of said first magnetic members and said first end of said second magnetic member and serving as a spacer for a plurality of parallel leaf springs for urging said magnetic head towards a magnetic recording medium.

* * * * *